United States Patent [19]
Stanton et al.

[11] Patent Number: 5,916,644
[45] Date of Patent: Jun. 29, 1999

[54] TUBULAR CASING WITH GLUED SPLICE AND METHOD FOR ITS MANUFACTURE

[75] Inventors: William Harold Stanton, Covington; Norman Gene Hensley, West Lafayette, both of Ind.; Ralph Guenter Jerutka, Champaign, Ill.

[73] Assignee: Teepak Investments, Inc., Wilmington, Del.

[21] Appl. No.: 08/699,756

[22] Filed: Aug. 20, 1996

[51] Int. Cl.$^6$ ..................................................... A22C 13/00
[52] U.S. Cl. ........................ 428/34.8; 428/35.6; 156/158; 156/291; 156/295; 156/331.2
[58] Field of Search .................. 428/34.8, 35.6; 156/158, 291, 295, 331.2

[56] References Cited

U.S. PATENT DOCUMENTS

| | | | |
|---|---|---|---|
| 2,631,509 | 3/1953 | Whytlaw | 93/94 |
| 3,070,483 | 12/1962 | Young et al. | 156/292 |
| 3,640,735 | 2/1972 | Oppenheimer et al. | 99/176 |
| 3,917,862 | 11/1975 | Bridgeford | 426/105 |
| 4,610,742 | 9/1986 | Rop et al. | 156/158 |
| 4,736,775 | 4/1988 | Oxley | 138/118.1 |
| 4,842,022 | 6/1989 | Oxley et al. | 138/118.1 |
| 5,273,482 | 12/1993 | Beckman et al. | 452/39 |

FOREIGN PATENT DOCUMENTS

| | | |
|---|---|---|
| 14353 | 8/1980 | European Pat. Off. . |
| 14354 | 8/1980 | European Pat. Off. . |
| 50702 | 5/1982 | European Pat. Off. . |
| 337244 | 10/1989 | European Pat. Off. . |
| 608481 | 8/1994 | European Pat. Off. . |
| 3907951 | 10/1989 | Germany . |
| 55-099980 | 7/1980 | Japan . |
| 59-102971 | 6/1984 | Japan . |
| WO 8200829 | 3/1982 | WIPO . |

*Primary Examiner*—Margaret W. Glass
*Attorney, Agent, or Firm*—Michael L. Dunn

[57] ABSTRACT

A method for adhering tubular casing material containing at least 25 weight percent water, during the process of its manufacture, which comprises applying a plurality of beads of a cyanoacrylate adhesive having a viscosity of from 250 to 1000 cps, to a surface of the casing or of a separate film material, and squeezing the casing surface and the film material together to form a bond. The invention also includes bonds and splices made in accordance with the method of the invention.

13 Claims, 2 Drawing Sheets

TUBULAR CASING WITH GLUED SPLICE AND METHOD FOR ITS MANUFACTURE

BACKGROUND OF THE INVENTION

This invention relates to tubular casings, especially such casings as are used for encasing food products such as meats and cheeses. The invention more particularly relates to tubular casings which comprise regenerated cellulose or collagen and to splices made in such casings either to connect casing sections or to close openings made in the casings during processing.

In the prior art, during manufacture, casings were sometimes slit to permit accumulated liquids and gases to escape from the interior. These slits then needed to be sealed to retain inflation by air for the purposes of curing. In the absence of air, the casing would deflate and create problems with self adhesion and irregular dry diameters. The slits were frequently sealed by removing the slit section of the casing and inserting couplers into the resulting open ends of the casing prior to entry of casing into the dryer. The couplers were removed after the dryer and the openings were sealed with splicing tape.

Before the present invention using tape to seal the open ends together was considered difficult, if not impossible, due to the fact that it is exceedingly difficult to get glue to adhere to a wet substrate such as an undried gel used in casing manufacture and in any case forming such splices upon wet casing material could not be done automatically.

BRIEF DESCRIPTION OF THE INVENTION

Figure 1:
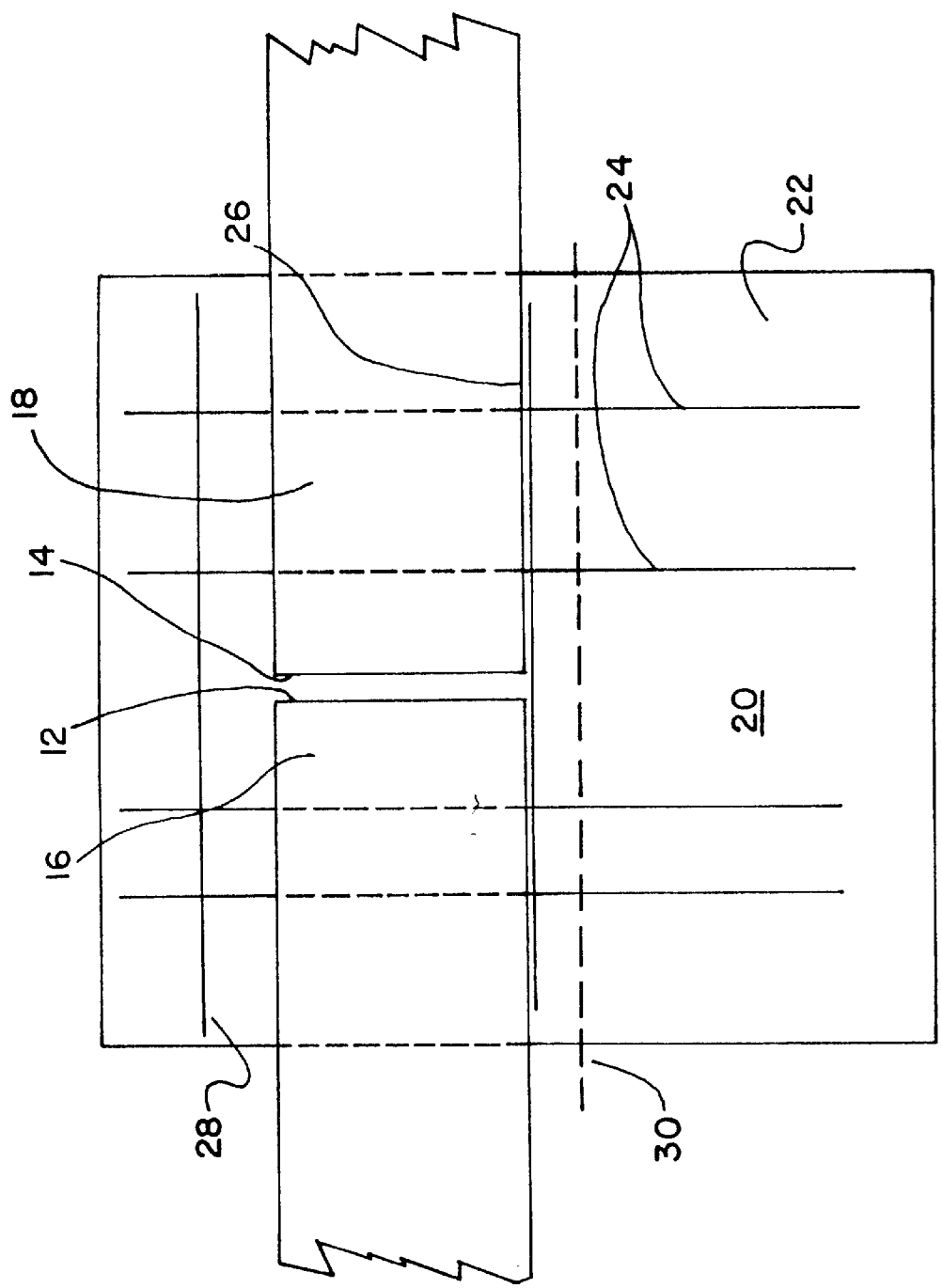
FIG. 1 is a plan view of a layout for making a "butt" splice in accordance with the present invention.

In accordance with the present invention a method is provided for forming an adhesive bond with an undried casing material during its process of manufacture. The present method is particularly applicable for forming splices between open ends of tubular sections of the casing which according to the method of the invention can be done automatically.

More particularly the invention comprises a method for adhering tubular casing material containing at least 25 weight percent water, during the process of its manufacture, which comprises applying a plurality of beads of a cyanoacrylate adhesive having a viscosity of from 250 to 1000 cps, to a surface of the casing or of a separate film material, and squeezing the casing surface and the film material together to form a bond. The film material may be additional casing material which is either in its original tubular shape or which has been slit along a longitudinal line to form a flat film material.

The foregoing steps can be done automatically by any suitable means, e.g. the casing material can be automatically cut by an air or electrically actuated knife at preset time intervals or upon detection of passage of a predetermined length of casing. Beads of adhesive can then be automatically applied to the film material by an air actuated applicator. The casing material can be automatically placed on the film material surface and squeezed together by pressure rolls or plates.

The surface is the combined exterior surfaces surrounding two abutting open ends of the casing and the film material is a single piece encompassing both exterior surfaces to form a splice between the open ends.

Both the casing material and film material may comprise regenerated cellulose. The casing material may be reinforced with fibers, such as cellulose fibers from hemp, or may be unreinforced regenerated cellulose film or collagen. The film material is usually unreinforced regenerated cellulose film, and may also be fiber reinforced cellulose, collagen or other suitable film.

The adhesive preferably has a viscosity of from about 300 to about 700 cps. The viscosity is usually controlled by the presence of a small amount, e.g. from 3 to 15 weight percent, of a polymeric material such as polymethylmethacrylate.

A preferred adhesive comprises from 87 to 92 weight percent ethyl cyanoacrylate, from 5 to 10 weight percent poly methyl methacrylate, from 0.1 to 1.0 weight percent phthalic anhydride and from 0.1 to 0.5 weight percent hydroquinone.

The invention includes the bonds and splices manufactured by the method of the invention.

DETAILED DESCRIPTION OF THE INVENTION

In accordance with the present invention, many bonds may be made; however, a splice having particularly good characteristics, herein called the "butt" splice, can be made using the method of the invention.

The "butt" splice was derived from initial attempts at covering the cut in the cellulose product with a tape or patch material. This method produced a bulky splice that created problems in later operations, such as shirring. For this reason, a smaller, less bulky splice was desired. The "butt" splice method took much testing as it was found that the exact amount of Cyanoacrylate adhesive placed in very specific areas, on the splicing material, was critical.

The "butt" type splice is made by precutting a film material such as a hydrophilic material capable of being moisturized to between 30% and 60% water content. Examples of this material could be reinforced or unreinforced cellulose type products. This material should be cut wide enough to cover all glue patterns, e.g. 1½ to 4 inches in width with the length being determined by the code size being spliced together.

The film material is then premoisturized to a moisture content of between 30% and 60%. Free water on the surface should be removed to reduce the chance of the adhesive curing before the splice can be completed.

The moisturized film material can then be placed on a folding device that will enable the film material to be folded over the product, e.g. wet cellulose, being spliced together.

The adhesive is then either manually or automatically applied to the film material in a predetermined location, e.g. six beads approximately 1/64" to 1/32" in width. The location (distance apart ½" to 2½") of the two beads running longitudinal with the wet product being spliced varies depending on the casing diameter. The four beads running across the cellulose product being spliced should be consistent (distance apart ¼" to ½") for all sizes but the length of the beads vary from one inch to three inches.

The ends of the two, e.g. cellulose, casing pieces are "butted" together between the two inner cross beads of adhesive, on the film material. This step can be either manual or automated.

With the aid of the folding device the film material is then folded over the "butted" ends, of cellulose product, making an airtight seal.

The completed splice is then removed from the folding device, either manually or automatically, and allowed to continue through the process.

The "butt" type method also allows the splice to remain in the dried, reeled cellulose product until further processing is desired.

The "butt" splice of the invention has been found to be water and air tight.

Figure 2:
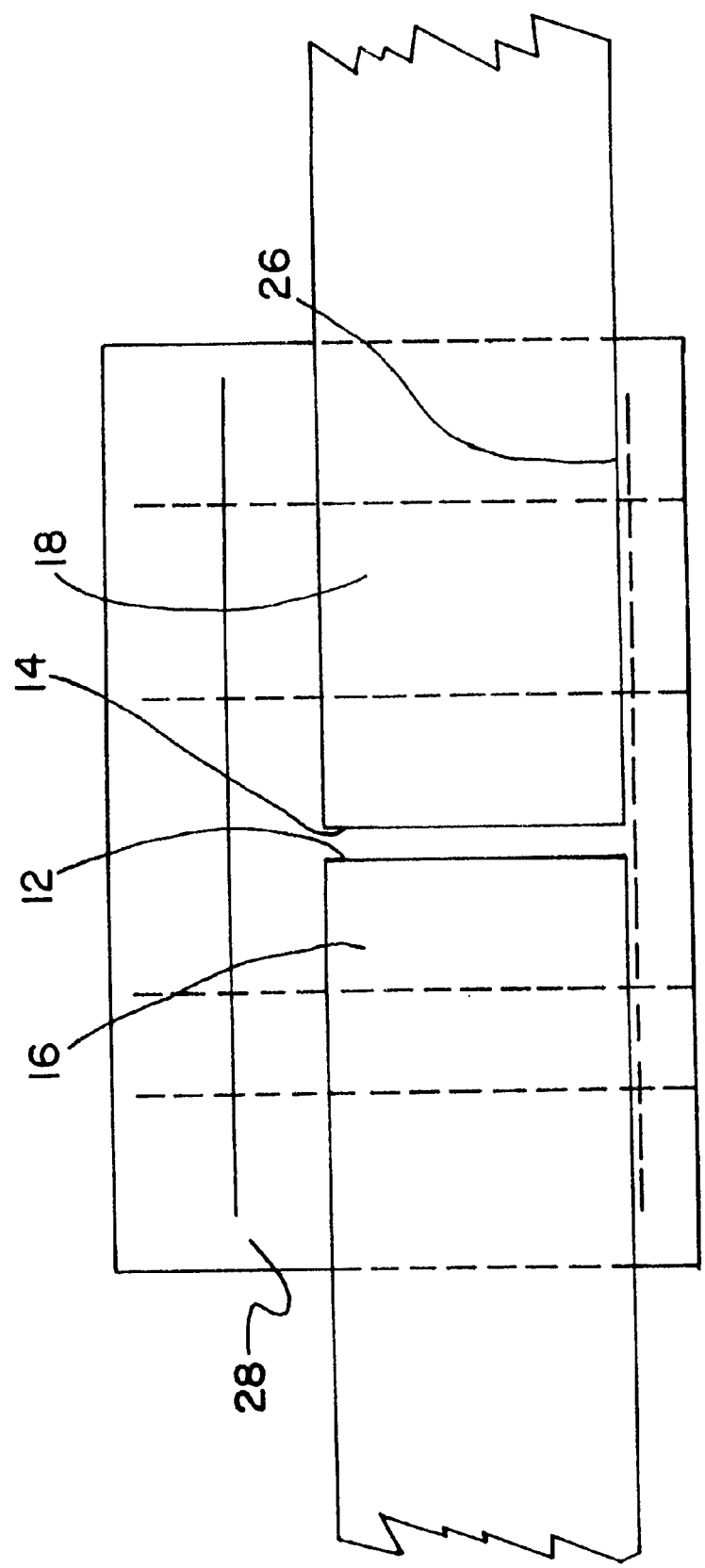
FIG. 2 is a cross sectional top view of a "butt" splice made in accordance with the present invention.

A layout for making the "butt" splice 10 can be seen in FIG. 1 where ends 12 and 14 of separate tubular sections 16 and 18 are abutted on the surface 20 of separate film material 22. The adhesive used in the invention is laid out in transverse beads 24, and longitudinal beads 26 and 28 upon surface 20. Film material 22 is then folded around ends 12 and 14 along fold line 30 to form the butt splice. The finished "butt" splice may be seen in FIG. 2.

In making butt splices as described above, numerous ethyl cyanoacrylate adhesives were used with results as described in the table below.

TABLE

| ADHESIVE | VISCOSITY (cps) | RESULT |
|---|---|---|
| Loctite* 405 | 300 | Good Adhesion/Gas Tight |
| Loctite 498 | 700 | Good Adhesion/Gas Tight |
| Henkel* T-500 | 500 | Good Adhesion/Gas Tight |
| Permabond* 795 | 500 | Good Adhesion/Gas Tight |
| Permabond 792 | 75 | Not Good/No Bead Control |
| Loctite 401 | 100 | Not Good/No Bead Control |
| Henkel T-1500 | 1500 | Not Good/Slow Cure |
| Loctite 410 | 3500 | Not Good/Slow Cure |

*Loctite is a trademark of Loctite Corporation.
Henkel is a trademark of Henkel Corporation.
Pennabond is a trademark of National Starch Chemical Company.

What is claimed is:

1. A method for adhering a surface of a tubular casing material as a wet substrate containing at least 25 weight percent water, during the process of its manufacture, which comprises applying a plurality of beads of a cyanoacrylate adhesive having a viscosity of from about 250 to about 1000 cps, to a surface selected from the group consisting of the substrate and a separate film material, and squeezing the wet substrate surface and the surfaces together to form a bond, said casing material comprising a material selected from the group consisting of regenerated cellulose and collagen and the film material comprising regenerated cellulose.

2. The method of claim 1 wherein the film material consists essentially of regenerated cellulose.

3. The method of claim 1 wherein the tubular casing surface comprises exterior surfaces surrounding two abutting open ends of the casing and the film material encompasses and is adhered to both exterior surfaces to form a splice between the open ends.

4. The method of claim 1 wherein the casing material comprises regenerated cellulose.

5. The method of claim 1 wherein the casing material comprises collagen and the film material comprises regenerated cellulose.

6. The method of claim 1 wherein the casing material comprises collagen and the film material comprises collagen.

7. The method of claim 1 wherein the adhesive has a viscosity of from about 300 to about 700 cps.

8. The method of claim 1 wherein the adhesive comprises from 87 to 92 weight percent ethyl cyanoacrylate, from 5 to 10 weight percent polymethylmethacrylate, from 0.1 to 1.0 weight percent phthalic anhydride and from 0.1 to 0.5 weight percent hydroquinone.

9. The method of claim 1 wherein the beads are applied to the surface of the film material.

10. A bond manufactured in accordance with the method of claim 1.

11. A splice manufactured in accordance with the method of claim 3.

12. The method of claim 3 wherein the film material consists essentially of regenerated cellulose.

13. The method of claim 4, wherein the film material consists essentially of regenerated cellulose.

\* \* \* \* \*